(12) United States Patent
Kinney et al.

(10) Patent No.: US 7,759,447 B2
(45) Date of Patent: Jul. 20, 2010

(54) LOW SURFACE ENERGY, ETHYLENICALLY UNSATURATED POLYISOCYANATE ADDITION COMPOUNDS AND THEIR USE IN COATING COMPOSITIONS

(75) Inventors: Carol L. Kinney, Pittsburgh, PA (US); Richard R. Roesler, Wexford, PA (US); James T. Garrett, Lake Monticello, VA (US); Aaron Lockhart, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 295 days.

(21) Appl. No.: 11/281,079

(22) Filed: Nov. 17, 2005

(65) Prior Publication Data

US 2007/0112163 A1 May 17, 2007

(51) Int. Cl.
*C08G 18/67* (2006.01)
*C08G 18/28* (2006.01)
*C08G 18/10* (2006.01)
*C08F 2/46* (2006.01)

(52) U.S. Cl. .............................. 528/75; 528/59; 528/70; 427/508

(58) Field of Classification Search .................... 528/70, 528/75, 59; 427/508
See application file for complete search history.

(56) References Cited

U.S. PATENT DOCUMENTS

| | | | |
|---|---|---|---|
| 4,119,681 A | 10/1978 | Veselovsky et al. | 260/859 R |
| 5,013,838 A * | 5/1991 | Scholl | 544/193 |
| 5,144,056 A | 9/1992 | Lina et al. | 560/25 |
| 5,344,956 A | 9/1994 | Allewaert et al. | 560/26 |
| 5,446,118 A | 8/1995 | Shen et al. | 526/245 |
| 5,541,281 A | 7/1996 | Yeske et al. | 528/70 |
| 5,574,122 A | 11/1996 | Yeske et al. | 528/28 |
| 5,576,411 A | 11/1996 | Yeske et al. | 528/70 |
| 5,646,227 A | 7/1997 | Slack et al. | 528/28 |
| 5,691,439 A | 11/1997 | Slack et al. | 528/49 |
| 5,747,629 A | 5/1998 | Yeske et al. | 528/70 |
| 5,914,383 A * | 6/1999 | Richter et al. | 528/59 |
| 6,403,760 B1 | 6/2002 | Weinert et al. | 528/402 |
| 6,746,812 B2 | 6/2004 | Watanabe et al. | 430/165 |
| 6,906,115 B2 | 6/2005 | Hanazawa et al. | 522/97 |

FOREIGN PATENT DOCUMENTS

| | | |
|---|---|---|
| EP | 0 273 449 A1 | 7/1988 |
| JP | 2996150 B2 | 12/1999 |
| JP | 2000-103824 | 4/2000 |
| WO | 2006/102383 A1 | 9/2006 |

OTHER PUBLICATIONS

Chinese Journal of Chemistry, 21(6) (month unavailable) 2003, pp. 698-705, Li-Bin Du et al, "Effects of Ethylene Oxide Spacer Length on Solution Properties of Water-Soluble Fluorocarbon-Containing Hydrophobically Associating Poly(Acrylic Acid-co-$R_f$-PEG Macromonomer)".

Chinese Journal of Chemistry, 19(4), (month unavailable) 2001, pp. 386-393, Shou-Ping Liu et al, "Synthesis and Characterization of Surfactant PEG Macromonomers with Fluorocarbon End-capped Groups and it Copolymers".

Progress in Organic Coatings, 36 (month unavailable) 1999, pp. 70-78, R. Bongiovanni et al, "Properties of UV-curable coatings containing fluorinated acrylic structures".

* cited by examiner

*Primary Examiner*—Milton I Cano
*Assistant Examiner*—Benjamin J Gillespie
(74) *Attorney, Agent, or Firm*—Robert S. Klemz; Noland J. Cheung

(57) ABSTRACT

The present invention is directed to polyisocyanate addition compounds which
i) are substantially free from isocyanate groups and are prepared from one or more a) polyisocyanate adducts and/or b) NCO prepolymers,
ii) contain urethane groups,
iii) contain fluorine in an amount of 0.01 to 50% by weight, and
iv) contain ethylenically unsaturated groups in an amount of 2 to 40% by weight,
wherein the preceding percentages are based on the solids content of the polyisocyanate addition compounds. The fluorine is incorporated by reacting an isocyanate group with a compound containing two or more carbon atoms, one or more hydroxyl groups and one or more fluorine atoms to form urethane and optionally allophanate groups. More than 50 mole % of the groups that incorporate fluorine into the addition compounds are urethane groups. The polyisocyanate addition compounds are useful in coating compositions that are curable by free radical polymerization.

9 Claims, No Drawings

LOW SURFACE ENERGY, ETHYLENICALLY UNSATURATED POLYISOCYANATE ADDITION COMPOUNDS AND THEIR USE IN COATING COMPOSITIONS

BACKGROUND OF THE INVENTION

1. Field of the Invention

The present invention is directed to low surface energy polyisocyanate addition compounds which contain ethylenically unsaturated groups, urethane groups and fluorine and to their use in coating compositions curable by free radical polymerization.

2. Description of Related Art

Polyisocyanate addition compounds, which contain ethylenically unsaturated groups, are prepared by the reaction of polyisocyanates with isocyanate-reactive compounds containing ethylenically unsaturated groups, and cure by free radical polymerization, are well known.

Although coatings prepared from these compositions possess many valuable properties, one property, in particular, which needs to be improved is the surface quality. It can be difficult to formulate coating compositions to obtain a coating having a smooth surface as opposed to one containing surface defects such as craters, etc.

It is believed that these difficulties are related to the high surface tension of the polyisocyanate addition compounds. Another problem caused by the high surface tension is the difficulty in cleaning the coatings. Regardless of their potential application area, there is a high likelihood that the coatings will be subjected to stains, graffiti, etc.

The incorporation of either fluorine or siloxane groups into polyisocyanates via allophanate groups in order to reduce the surface tension of the polyisocyanates and the surface energy of the resulting polyurethane coatings is disclosed in U.S. Pat. Nos. 5,541,281; 5,574,122; 5,576,411; 5,646,227; 5,691,439; and 5,747,629. During the cure of one-component and two-component coating compositions containing these polyisocyanates, which is relatively slow at room temperature and even at elevated temperatures, the polyisocyanate molecules containing fluorine or siloxane groups rise to the surface of the coating before being locked into position by urethane formation resulting in a low surface energy.

Polyisocyanate addition compounds containing ethylenically unsaturated groups and fluorine are disclosed in two articles by Du et al and Liu et al from the Chinese Journal of Chemistry (2003), 21(6), 698-705 and (2001), 19(4), 386-393; Japanese Patent No. 2000103824; Bongiovanni et al, Progress in Organic Coatings, (1999), 36(1-2), 70-78; U.S. Pat. Nos. 5,446,118 and 5,144,056. All of these references describe the preparation of polyaddition compounds from diisocyanate monomers.

Polyisocyanate addition compounds containing ethylenically unsaturated groups and fluorine are also disclosed in U.S. Pat. No. 6,746,812 and Japanese Patent No. 2996150. In these patents the polyisocyanate addition products were prepared from polyisocyanate adducts containing urethane groups. Finally, in U.S. Pat. No. 6,906,115 polyisocyanate addition products containing ethylenically unsaturated groups and fluorine were prepared from polyisocyanate trimers.

It is an object of the present invention to provide polyisocyanate addition compounds which have reduced surface tension and, thus, are suitable for the production of coatings which have lower surface energies, improved surfaces and improved cleanability and which also possess the other valuable properties of the known coatings prepared from ethylenically unsaturated compounds.

These objectives may be achieved with the polyisocyanate addition compounds of the present invention containing ethylenically unsaturated groups, urethane groups and fluorine which are described hereinafter. It is surprising that coatings obtained from these polyisocyanates have low surface energies. Because of the rapid cure that these coatings undergo during free radical polymerization, it would be expected that the fluorine-containing molecules would be trapped below the surface and, thus, would not be able to provide coatings having low surface energies.

SUMMARY OF THE INVENTION

The present invention is directed to polyisocyanate addition compounds which i) are substantially free from isocyanate groups and are prepared from one or more a) polyisocyanate adducts containing uretdione, biuret, allophanate, carbodiimide and/or oxadiazinetrione groups and/or b) NCO prepolymers, ii) contain urethane groups, iii) contain fluorine (calculated as F, AW 19) in an amount of 0.01 to 50% by weight, and iv) contain ethylenically unsaturated groups (calculated as C=C, MW 24) in an amount of 2 to 40% by weight, wherein at least a portion of said ethylenically unsaturated groups are incorporated by reacting an isocyanate group with the reaction product of (meth)acrylic acid with ε-caprolactone and wherein the preceding percentages are based on the solids content of the polyisocyanate addition compounds and wherein fluorine is incorporated by reacting an isocyanate group with a compound containing two or more carbon atoms, one or more hydroxyl groups and one or more fluorine atoms to form urethane groups and optionally allophanate groups, provided that more than 50 mole % of the groups that chemically incorporate fluorine into the polyisocyanate addition compounds are urethane groups.

The present invention also relates to the use of the polyisocyanate addition compounds in coating compositions curable by free radical polymerization.

DETAILED DESCRIPTION OF THE INVENTION

In accordance with the present invention the term "(cyclo) aliphatically bound isocyanate groups" means aliphatically and/or cycloaliphatically bound isocyanate groups.

Examples of suitable polyisocyanates which may be used as the polyisocyanate component to prepare the polyisocyanate addition compounds include a) polyisocyanate adducts containing uretdione, biuret, allophanate, carbodiimide and/or oxadiazinetrione groups and b) NCO prepolymers having an average functionality of 1.5 to 6, preferably 1.8 to 6, more preferably 2 to 6 and most preferably 2 to 4.

The polyisocyanates adducts preferably have an average functionality of 2 to 6, more preferably 2 to 4, and an NCO content of 5 to 30% by weight, preferably 10 to 25% by weight and more preferably 15 to 25% by weight, and include:

1) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates.

2) Biuret group-containing polyisocyanates which may be prepared according to the processes disclosed in U.S. Pat.

Nos. 3,124,605; 3,358,010; 3,644,490; 3,862,973; 3,903,126; 3,903,127; 4,051,165; 4,147,714; or 4,220,749 by using co-reactants such as water, tertiary alcohols, primary and secondary monoamines, and primary and/or secondary diamines.

3) Allophanate group-containing polyisocyanates which may be prepared according to the processes disclosed in U.S. Pat. Nos. 3,769,318, 4,160,080, 4,177,342, and 6,392,011. Preferred catalysts for the preparation of these polyisocyanates include organic tin(II) salts such as tin(II) octoate.

4) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

5) Polyisocyanates containing oxadiazinetrione groups, e.g., the reaction product of two moles of a diisocyanate and one mole of carbon dioxide.

Preferred polyisocyanate adducts are those containing uretdione, biuret, and/or allophanate groups Suitable monomeric diisocyanates for preparing the polyisocyanate adducts may be represented by the formula $$R(NCO)_2$$

in which R represents an organic group obtained by removing the isocyanate groups from an organic diisocyanate having a molecular weight of about 140 to 400. Preferred diisocyanates for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-iso-cyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4"-triphenylmethane diisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanatocyclohexyl)-methane, α,α,α',α'-tetramethyl-1,3- and/or -1,4-xylylene diisocyanate, 2,4- and/or 2,6-toluylene diisocyanate, and 2,4- and/or 4,4'-diphenylmethane diisocyanate.

The NCO prepolymers, which may also be used as the polyisocyanate component to prepare the polyisocyanate addition compounds, are prepared from the previously described monomeric polyisocyanates or polyisocyanate adducts, preferably monomeric diisocyanates, and organic compounds containing at least two isocyanate-reactive groups, preferably at least two hydroxyl groups. These organic compounds include high molecular weight compounds having molecular weights of 600 to about 6,000, preferably 800 to about 3,000, and optionally low molecular weight compounds with molecular weights below 600. The molecular weights are number average molecular weights ($M_n$) and are determined by end group analysis (OH and/or NH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, while the polyester polyols and polyhydroxy polycarbonates are more preferred.

Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaspartates and polyaldimines disclosed in U.S. Pat. Nos. 5,243,012 and 5,466,771, respectively, herein incorporated by reference. A particular advantage for the use of polyaspartates to prepare the isocyanate addition products is that during the subsequent curing of these products the urea groups react to form thermally stable hydantoin groups.

The NCO prepolymers generally have an isocyanate content of 0.4 to 20% by weight, preferably 0.4 to 15% by weight and more preferably 0.5 to 10.0% by weight. The NCO prepolymers are prepared in known manner by the reaction of the above mentioned starting materials at a temperature of 40 to 120° C., preferably 50 to 100° C. and at an NCO/OH (and/or NH) equivalent ratio of about 1.3:1 to 20:1 preferably about 1.4:1 to 10:1. If chain extension via urethane groups is desired during the preparation of the NCO prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate (and any volatile solvent used during the preparation) may optionally be removed by thin layer distillation when the reaction is completed. In accordance with the present invention NCO prepolymers also include NCO semi-prepolymers which contain unreacted starting polyisocyanates in addition to the urethane group-containing prepolymers.

In accordance with the present invention urethane groups are incorporated into the polyisocyanate addition compounds by the use of compounds containing two or more carbon atoms, one or more hydroxyl groups (preferably one or two hydroxyl groups, more preferably one) and one or more fluorine atoms (preferably in the form of fluoroalkyl groups such as ). Examples of these compounds include aliphatic, cycloaliphatic, araliphatic or aromatic hydroxyl group-containing compounds, which contain two or more carbon atoms and also contain fluorine atoms, preferably fluoroalkyl groups. The compounds may be linear, branched or cyclic and have a molecular weight (number average molecular weight as determined by gel permeation chromatography using polystyrene as standard) of up to 50,000, preferably up to 10,000, more preferably up to 6000 and most preferably up to 2000. These compounds generally have OH numbers of greater than 5, preferably greater than 25 and more preferably greater than 35. The hydroxyl group-containing compounds may optionally contain other hetero atoms in the form of, e.g., ether groups, ester groups, carbonate groups, acrylic groups, etc.

Thus, it is possible in accordance with the present invention to use the known polyols from polyurethane chemistry, provided that they contain fluorine, e.g. by using fluorine-containing alcohols, acids, unsaturated monomers, etc. in the preparation of these polyols. Examples of these polyols, which may be prepared from fluorine-containing precursors and used in accordance with the present invention, are disclosed in U.S. Pat. No. 4,701,480, the disclosure of which is herein incorporated by reference. Additional examples of suitable fluorine-containing compounds are disclosed in U.S. Pat. Nos. 5,294,662 and 5,254,660, the disclosures of which are herein incorporated by reference.

Preferred for use according to the invention are compounds containing one or more hydroxyl groups, preferably one or two hydroxyl groups and more preferably one hydroxyl group; one or more fluoroalkyl groups; optionally one or more methylene groups; and optionally other hetero atoms such as ether groups. These compounds preferably have a molecular weight of less than 2000 or a hydroxyl number of greater than 28.

In the polyisocyanate addition compounds according to the invention the minimum ratio of fluorine-containing compounds to polyisocyanate is about 0.01 millimoles, preferably about 0.1 millimoles and more preferably about 1 millimole of fluorine-containing compounds for each mole of polyisocyanate. The maximum amount of fluorine-containing compounds to polyisocyanate is about 500 millimoles, preferably about 100 millimoles and more preferably about 50 millimoles of fluorine-containing compounds for each mole of polyisocyanate. The amount of fluorine is selected such that the resulting polyisocyanate addition compound contains a minimum of 0.01% by weight, preferably 0.05% by weight and more preferably 0.1% by weight, of fluorine (calculated as F, AW 19), based on solids, and a maximum of 50% by weight, preferably 10% by weight, more preferably 7% by weight and most preferably 3% by weight of fluorine, based on solids.

Suitable isocyanate-reactive compounds containing ethylenically unsaturated groups for preparing the polyisocyanate addition compounds of the present invention are compounds containing 1 to 3, preferably 1 to 2 and more preferably 1 isocyanate-reactive group, preferably hydroxyl or amino groups and more preferably hydroxyl groups; and 1 to 3, preferably 1 ethylenically unsaturated group.

Examples of these ethylenically unsaturated compounds include the hydroxyalkyl acrylates and methacrylates corresponding to the formula:

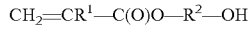

wherein $R^1$ is hydrogen or methyl and $R^2$ is a linear or branched alkylene group having 2 to 10 carbon atoms, preferably 2 to 4 carbon atoms. Examples of suitable hydroxyalkyl(meth)acrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxy-propyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

Other suitable ethylenically unsaturated compounds include the alkoxylation products of the preceding hydroxyalkyl(meth)acrylates, preferably with propylene or ethylene oxide; reaction products of hydroxylalkyl(meth)acrylates with lactones such as ε-caprolactone; reaction products of acrylic and/or methacrylic acid, preferably acrylic acid, with glycidyl acrylate, glycidyl methacrylate, glycidyl cinnamate, glycidyl crotonate, glycidyl allyl ether, glycidyl cinnamyl ether and/or glycidyl crotyl ether, preferably glycidyl methacrylate; reaction products of (meth)acrylic acid with excess quantities of higher functional saturated alcohols such as glycerol diacrylate, trimethylol propane diacrylate and pentaerythritol triacrylate and the corresponding methacrylates; β,γ-ethylenically unsaturated ether alcohols, preferably having 5 to 14 carbon atoms and containing at least one, preferably at least two, β,γ-ethylenically unsaturated ether groups, such as allyl alcohol, glycerol diallyl ether, trimethylol propane diallyl ether and pentaerythritol triallyl ether; hydroxyalkyl vinyl ethers such as 2-hydroxyethyl vinyl ether, and 4-hydroxybutyl vinyl ether, 3-hydroxy-1,4-pentadiene and 3-hydroxy-3-ethenyl-1,4-pentadiene; reaction products of (meth)acrylic acids with monoepoxide compounds; 4-hydroxy styrene; 4-(hydroxymethyl) styrene; and hydroxy-functional, ethylenically unsaturated compounds containing at least two hydroxyl groups such as trimethylol propane monoacrylate and monoallyl ether, glycerol mono-acrylate and monoallyl ether and pentaerythritol diacrylate and diallyl ether.

The polyisocyanate addition compounds are prepared by reacting the polyisocyanates with the hydroxyl compounds containing fluorine to form urethane groups. The resulting products are then reacted with the isocyanate-reactive compounds containing ethylenically unsaturated groups until substantially all of the isocyanate groups have been reacted. It is also possible to react the compounds containing ethylenically unsaturated groups with the polyisocyanates before the hydroxyl compounds containing fluorine are reacted, or both of these compounds can be reacted with the polyisocyanates simultaneously.

Suitable methods for preparing the polyisocyanate mixtures containing urethane groups are known. The urethanization reaction may be conducted at a temperature of 40 to 140° C., preferably 60 to 90° C. and more preferably 70 to 80° C., in the presence of a known urethane catalyst, such as an organometallic salt or a tertiary amine. The reaction may be terminated by reducing the reaction temperature, by removing the catalyst, e.g., by applying a vacuum, or by the addition of a catalyst poison. After the reaction is terminated, any volatile, unreacted monomeric polyisocyanates may be removed, e.g., by thin film evaporation, but this is not necessary because the isocyanate groups present in the resulting products will subsequently be reacted with the isocyanate-reactive compounds containing ethylenically unsaturated groups or with the hydroxyl compounds containing fluorine.

The urethanization reaction may be carried out in the absence or in the presence of solvents which are inert to isocyanate groups, preferably in the absence of solvents, especially when liquid starting materials are used. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

The process according to the invention may take place either batchwise or continuously, for example, as described below. The starting polyisocyanate is introduced with the exclusion of moisture and optionally with an inert gas into a suitable stirred vessel or tube and optionally mixed with a solvent which is inert to isocyanate groups such as toluene, butyl acetate, diisopropylether or cyclohexane. In a preferred embodiment of the present invention the previously described compounds containing hydroxyl groups and fluorine are reacted with the polyisocyanates before the isocyanate-reactive compounds containing ethylenically unsaturated groups. The compounds containing hydroxyl groups and fluorine may be introduced into the reaction vessel in accordance with several embodiments. They may be mixed with the starting polyisocyanates and introduced into the reaction vessel; they may be separately added to the reaction vessel either before or after, preferably after, the polyisocyanates are added; or the catalyst may be dissolved in these compounds prior to introducing the solution into the reaction vessel.

The progress of the reaction is followed by determining the NCO content by a suitable method such as titration, refractive index or IR analysis. Thus, the reaction may be terminated at the desired degree of urethanization, preferably at the theoretical NCO content.

The intermediate products are polyisocyanates containing urethane groups and fluorine. These polyisocyanates have an average functionality of 1.5 to 6, preferably 2 to 6, and more preferably 2 to 4; and an NCO content of 1 to 30% by weight, preferably 1 to 25% by weight and more preferably 5 to 25% by weight, based on the solids content of the polyisocyanates containing urethane groups and fluorine.

The reaction between the polyisocyanates containing urethane groups and fluorine and the isocyanate-reactive compounds containing ethylenically unsaturated groups may be carried out by adding the reactants and optionally an inhibitor to the reaction vessel in any order. The amounts of the reactants are selected such that the number of isocyanate groups of the polyisocyanate to the number of isocyanate-reactive groups of the ethylenically unsaturated compound is essentially equivalent, i.e., the NCO:OH+NH equivalent ratio is 1.10:1 to 1:1.10, preferably 1.05:1 to 1:1.05 and more preferably 1.02:1 to 1:1.02. After the reactants have been added a catalytic amount of a urethane catalyst, e.g., dibutyl tin dilaurate, is added and the mixture is typically heated to a temperature of about 40 to 90° C., preferably about 60° C. During the initial reaction exotherm the temperature is maintained below 90° C. After the reaction mixture cools the temperature is maintained between 60° C. and 70° C. until the isocyanate content is <0.5% by weight as measured for example by titration with dibutyl amine. If the isocyanate content is too high, an additional amount of an isocyanate-reactive compound can be added to react with any remaining isocyanate groups. Thereafter, the product is cooled prior to storage.

Alternatively, one of the reactants can be added with the other additives and then the other reactant can be added. When the isocyanate component is added first, it is possible to initially add less than the total quantity of the isocyanate-reactive component. After the reaction is essentially complete, the isocyanate content can be determined and then the remainder of the isocyanate-reactive component can be added in an amount that is essentially equivalent to the number of isocyanate groups remaining.

The polyisocyanate addition compounds have a content of ethylenically unsaturated groups (calculated as C═C, MW 24) of 2 to 40% by weight, preferably 2 to 20% by weight, and more preferably 2 to 10% by weight, based on the weight of the polyisocyanate addition compounds.

Prior to their use in the coating compositions curable by free radical polymerization, the polyisocyanate addition compounds according to the invention may be blended with other known polyaddition compounds containing ethylenically unsaturated groups. The amount of the polyisocyanate addition compounds according to the invention that must be blended with these other polyisocyanate addition compounds is dependent upon the fluorine content of the polyisocyanate addition compounds according to the invention, the intended application of the resulting coating compositions and the amount of low surface energy properties which are desired for this application.

To obtain low surface energy properties the resulting blends of polyisocyanate addition compounds should contain a minimum of 0.01% by weight, preferably 0.05% by weight and more preferably 0.1% by weight, of fluorine (AW 19), based on solids, and a maximum of 10% by weight, preferably 7% by weight and more preferably 3% by weight of fluorine (AW 19), based on solids. While fluorine contents of greater than 10% by weight are also suitable for providing low surface energy coatings, there are no further improvements to be obtained by using higher quantities. By knowing the fluorine content of the polyisocyanate addition compounds according to the invention and the desired fluorine content of the resulting blends, the relative amounts of the polyisocyanate addition compounds according to the invention and other polyisocyanate addition compounds may be readily determined.

In accordance with the present invention any of the polyisocyanate addition compounds according to the invention can be blended with the other polyisocyanate addition compounds, provided that the resulting blends have the minimum fluorine content required for the polyisocyanate addition compounds of the present invention. However, the polyisocyanate addition compounds to be blended preferably have a minimum fluorine content of 5% by weight, more preferably 10% by weight, and preferably have a maximum fluorine content of 50% by weight, more preferably 40% by weight and most preferably 30% by weight. These so-called "concentrates" may then be blended with the other polyisocyanate addition compounds to form blends that may be used to prepare coatings having low surface energy characteristics.

Several advantages are obtained by preparing concentrates with high fluorine contents and subsequently blending them with non-fluorine-containing polyisocyanate addition compounds. Initially, it is possible to convert many products to low surface energy polyisocyanate addition compounds while only producing one concentrate. By forming such low surface energy polyisocyanate addition compounds by blending commercially available polyisocyanate addition compounds with concentrates, it is not necessary to separately prepare each of the products in both a fluorine-containing and a non-fluorine-containing form. One possible disadvantage of the highest fluorine contents is that all of the isocyanate groups of a small portion of the starting polyisocyanate may be reacted. These molecules that do not contain isocyanate groups cannot be reacted with the ethylenically unsaturated compounds and, thus, cannot be incorporated into the resulting coating, which may adversely affect the properties of the final coating.

The polyisocyanate addition compounds according to the invention may also be used in water borne coating compositions. To be useful in these compositions the polyisocyanate addition compounds may be rendered hydrophilic either by blending with external emulsifiers or by chemically incorporating compounds containing cationic, anionic or non-ionic groups. The reaction with the hydrophilic compound may be carried out either before, during or after the urethanization reaction to incorporate the fluorine-containing compound. Methods for rendering the polyisocyanates hydrophilic are disclosed in U.S. Pat. Nos. 5,194,487 and 5,200,489, the disclosures of which are herein incorporated by reference. The reduced surface tensions of the modified polyisocyanate addition compounds enhance pigment dispersion and substrate wetting.

In addition to the polyisocyanate addition compounds according to the invention, the coating compositions may also contain known additives. Examples of these additives include wetting agents, flow control agents, antiskinning agents, antifoaming agents, matting agents, (such as silica, aluminum silicates and high-boiling waxes), viscosity regulators, pigments (including both organic and inorganic pigments), dyes, UV absorbers and stabilizers against thermal and oxidative degradation.

Other additives include copolymerizable monomers and inert organic solvents, preferably copolymerizable monomers. Suitable copolymerizable monomers are selected from organic compounds which contain 1 to 4, preferably 2 to 4, ethylenically unsaturated groups, and preferably have a viscosity of not more than 1000, more preferably not more than 500 mPa·s at 23° C., such as di- and poly(meth)acrylates of glycols having 2 to 6 carbon atoms and polyols having 3 to 4 hydroxyl groups and 3 to 6 carbon atoms.

Examples include ethylene glycol diacrylate, propane 1,3-diol diacrylate, butane 1,4-diol diacrylate, hexane 1,6-diol diacrylate, trimethylol-propane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylol-propane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

Examples of suitable solvents include those known from polyurethane coating technology such as toluene, xylene, cyclohexane, butyl acetate, ethyl acetate, ethyl glycol acetate, methoxypropyl acetate (MPA), acetone, methyl ethyl ketone and mixtures thereof. Low molecular weight alcohols may also be used, but they should preferably be added after all of the isocyanate groups have been reacted.

The copolymerizable monomers are present in a maximum total amount of about 100% by weight, preferably about 60% by weight and more preferably about 40% by weight, based on the total weight of the polyisocyanate addition compounds. The organic solvents are present in a maximum total amount of about 150% by weight, preferably about 100% by weight and more preferably about 50% by weight, based on the total weight of the polyisocyanate addition compounds. When one or more of these diluents is present the minimum combined amount of the copolymerizable monomer and the organic solvent is at least about 10% by weight, preferably at least about 15% by weight and more preferably at least about 20% by weight, based on the total weight of the polyisocyanate addition compounds.

The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

After the optional evaporation of a portion or all of any inert solvents used, the coatings may be crosslinked by free radical polymerization by using high energy radiation; low energy radiation (preferably having a wavelength of at least 320 nm, more preferably about 320 to 500 nm), such as UV or visible light; electron beams; γ rays; mercury, xenon, halogen or carbon arc lamps; sunlight; radioactive sources; by heating to elevated temperatures in the presence of peroxides or azo compounds; or by curing with metal salts of siccative acids and optionally (hydro)peroxides at either elevated temperatures or at temperatures of room temperature or below.

When the coating compositions are crosslinked by UV irradiation, photoinitiators are added to the coating composition. Suitable photoinitiators are known and include those described in the book by J. Korsar entitled "Light-Sensitive Systems", J. Wiley & Sons, New York-London-Sydney, 1976, and in Houben-Weyl, Methoden der Organischen Chemie, Volume E 20, page 80 et seq, Georg Thieme Verlag, Stuttgart, 1987.

Particularly suitable photoinitiators include benzoin ethers such as benzoin isopropyl ether, benzil ketals such as benzil dimethylketal, and hydroxyalkyl phenones such as 1-phenyl-2-hydroxy-2-methylpropan-1-one. The photoinitiators may be added in amounts, depending upon the application, of 0.1 to 10%, preferably 0.1 to 5% by weight, based on the weight of the ethylenically unsaturated polyurethanes and any other copolymerizable monomers. The photoinitiators may be added individually or may be used as mixtures to obtain advantageous synergistic effects.

To cure the coating compositions at elevated temperatures, curing must be conducted in the presence of 0.1 to 10%, preferably 0.1 to 5% by weight, based on the weight of the ethylenically unsaturated polyurethanes, of initiators such as peroxides or azo compounds. Temperatures of 80 to 240° C., preferably 120 to 160° C., are needed to cure the coating compositions at elevated temperatures.

Suitable initiators include the known free-radical initiators, e.g., aliphatic azo compounds such as azodiisobutyronitrile, azo-bis-2-methyl-valeronitrile, 1,1'-azo-bis-1-cyclohexanenitrile and alkyl 2,2'-azo-bis-isobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxy-dicarbonate; tert-butyl peroxy-2-ethylhexanoate and tert-butyl perbenzoate; hydroperoxides such as tert-butyl hydroperoxide and cumene hydroperoxide; and dialkyl peroxides such as dicumyl peroxide, tert-butyl cumyl peroxide or ditert-butyl peroxide.

The coating compositions according to the invention may also be cured at room temperature in the presence of siccatives and optionally (hydro)peroxides, provided that a portion of the isocyanate groups have been reacted with β,γ-ethylenically unsaturated ether alcohols. Acryloyl groups cannot be cured by this method; however, once the allyl ether groups have been initiated, they can react with the (meth)acryloyl groups.

Suitable siccatives are known and include metal salts, preferably cobalt or vanadium salts, of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Cobalt and vanadium compounds which are soluble in the coating compositions and act as siccatives are particularly suitable and include salts of the acids mentioned above and also commercial products such as "Vanadiumbeschleuniger VN-2 (Vanadium Accelerator VN-2)" marketed by Akzo. The siccatives are generally used in the form of organic solutions in quantities such that the metal content is 0.0005 to 1.0% by weight, preferably 0.001 to 0.5% by weight, based on the weight of the ethylenically unsaturated polyurethanes.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxy-dicarbonate, tert.-butyl hydroperoxide, cumene hydroperoxide, 2,5-dimethyl-hexane-2,5-hydroperoxide and diisopropyl benzene monohydroperoxide. The (hydro)peroxides are preferably used in quantities of 1 to 10% by weight, based on the weight of the ethylenically unsaturated polyurethanes.

When cured in the presence of cobalt and peroxides, the coating compositions generally cure over a period of 1 to 24 hours at 20° C. to form high-quality coatings. However, curing may also take place at lower temperatures (for example −5° C.) or more quickly at higher temperatures of up to 130° C.

The coating compositions containing the polyisocyanate addition compounds according to the invention provide coatings which have good dry times, adhere surprisingly well to a metallic base, and are particularly light-fast, color-stable in the presence of heat and very resistant to abrasion. They are also characterized by high hardness, elasticity, very good resistance to chemicals, high gloss, good weather resistance, good environmental etch resistance and good pigmenting qualities. Above all, the coating compositions have an excellent surface appearance and excellent cleanability.

The invention is further illustrated, but is not intended to be limited by the following examples.

EXAMPLES

All of the amounts, parts and percentages set forth in the tables are by weight and based on resin solids unless otherwise specified.

Fluorinated Alcohol BA-L

A fluorinated alcohol having a molecular weight of 443 (available from DuPont as Zonyl BA-L) and corresponding to the general formula

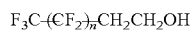

$F_3C\text{-}(CF_2)_n\text{-}CH_2CH_2OH$

Polyisocyanate 3400

An uretdione and isocyanurate group-containing polyisocyanate prepared from 1,6-hexamethylene diisocyanate and having an isocyanate content of 21.5%, a content of monomeric diisocyanate of <0.50%, a viscosity at 25° C. of 200 mPa·s and a surface tension of 40 dynes/cm (available from Bayer Material Science as Desmodur N 3400).

Acrylate M 100

A poly(ε-caprolactone) ester of 2-hydroxyethyl acrylate (Tone M 100, available from Dow Chemicals, hydroxyl equivalent weight—344)

Photoinitiator 184

1-Hydroxycyclohexyl phenyl ketone photoinitiator (Irgacure 184, available from Ciba Specialty Chemicals.

Surface Tension of Liquid Samples

The Wilhelmy plate technique (flamed glass slides) was used to determine surface tension. Samples were analyzed with a Cahn DCA 312 dynamic contact angle analyzer. All samples were stirred prior to analysis.

Surface Energy of Film Samples

Advancing angles of water and methylene iodide, polar and non-polar solvents respectively, were measured using a Rame-Hart goniometer. Total solid surface energies, including the polar and dispersive components, were calculated using the advancing angles according to the Owens Wendt procedure.

Example 1

Preparation of Polyisocyanate 1 Containing Urethane Groups and Fluorine 346.5 g (1.75 eq, based on actual titrated value) of Polyisocyanate 3400 and 3.5 g (0.008 eq) of Fluorinated Alcohol BA-L were charged to a 500 ml, 3-neck round bottom flask equipped with mechanical stirring, a cold water condenser, heating mantle, and $N_2$ inlet. The reaction was stirred and heated to 80° C. After cooking for 7 hours at 80° C., the NCO content reached its theoretical value of 20.9%. The heat was removed and a cold water/ice bath was applied. The resulting product had the following properties:

| | |
|---|---|
| Viscosity | 158 mPa · s @ 25° C. |
| Surface Tension of the liquid | 25.2 dynes/cm |
| Equiv. % - OH | 0.5% |
| % NCO | 20.9% |
| % F | 0.7% |

Example 2

Preparation of Polyisocyanate Addition Compound 1—According to the Invention 70 g (0.35 eq) of Polyisocyanate 1 were charged to a 500 ml, 3-neck, round bottom flask equipped with mechanical stirring, a cold water condenser, heating mantle, and dry air sparge. This was heated to 60° C. and 0.98 g of BHT were added before 120 g (0.35 eq) of M 100 were charged through an addition funnel. When the addition of the acrylate was complete, 0.04 g of dibutyl tin dilaurate were added. The temperature was maintained at 60° C. After 8 hours, no NCO peak was evident by IR. The resulting product had the following properties:

| | |
|---|---|
| Viscosity | 7245 mPa · s @ 25° C. |
| Surface Tension of the liquid | solid, crystallized with time |
| % F in Polyisocyanate Addition Compound | 0.2% |
| % C═C in Polyisocyanate Addition Compound | 4.4% |

This example demonstrates that it is possible to prepare polyisocyanate addition compounds according to the invention with low surface tension.

Example 3

Preparation of a Coating Composition Curable by Free Radical Polymerization

A coating composition curable by free radical polymerization was prepared by diluting the polyisocyanate addition compound from Example 2 with a 50/50 w/w solvent blend of butyl acetate and xylene to approximately 200 mPa·s and adding 3 parts by weight of Photoinitiator 184, based on solids. A 6-mil drawdown bar was used to draw a coating on a cold roll unpolished steel panel. The coating was flashed for 10 minutes and cured in the UV Fusion System under 100% lamp intensity at 20 rpm belt speed to provide a clear film. The details of Example 3 are set forth in Table 3.

| | |
|---|---|
| Polyisocyanate Addition Compound | 9.3 g |
| Solvent Blend | 4.0 g |
| % F in Polyisocyanate Addition Compound | 0.2% |
| % C═C in Polyisocyanate Addition Compound | 4.4% |
| Surface Energy | 5 dynes/cm |

This example demonstrates that the polyisocyanate addition compounds according to the invention can be cured to provide clear coatings having a low surface energy.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polyisocyanate addition compounds which
    i) are substantially free from isocyanate groups and are prepared from one or more a) polyisocyanate adducts containing uretdione, allophanate, carbodiimide and/or oxadiazinetrione groups and/or b) NCO prepolymers,
    ii) contain urethane groups,
    iii) contain fluorine (calculated as F, AW 19) in an amount of 0.01 to 50% by weight, and
    iv) contain ethylenically unsaturated groups (calculated as C═C, MW 24) in an amount of 2 to 40% by weight, wherein at least a portion of said ethylenically unsaturated groups are incorporated by reacting an isocyanate group with the reaction product of (meth)acrylic acid with ε-caprolactone and wherein the preceding percentages are based on the solids content of the polyisocyanate addition compounds and wherein fluorine is incorporated by reacting an isocyanate group with a compound containing two or more carbon atoms, one or more hydroxyl groups and one or more fluorine atoms to form urethane groups and optionally allophanate groups, provided that more than 50 mole % of the groups that chemically incorporate fluorine into the polyisocyanate addition compounds are urethane groups.

2. The polyisocyanate addition compounds of claim 1 wherein fluorine is incorporated by reacting an isocyanate group with a compound containing two or more carbon atoms, one hydroxyl group and one or more fluorine atoms.

3. The polyisocyanate addition compounds of claim 1 wherein said polyisocyanate addition compounds are prepared from one or more a) polyisocyanate adducts containing uretdione, urethane and/or allophanate groups.

4. The polyisocyanate addition compounds of claim 2 wherein said polyisocyanate addition compounds are prepared from one or more a) polyisocyanate adducts containing uretdione, urethane and/or allophanate groups.

5. The polyisocyanate addition compounds of claim 1 wherein the polyisocyanate addition compounds contain 0.05 to 10% by weight, based on solids, of fluorine and 2 to 20% by weight of ethylenically unsaturated groups.

6. The polyisocyanate addition compounds of claim 2 wherein the polyisocyanate addition compounds contain 0.05 to 10% by weight, based on solids, of fluorine and 2 to 20% by weight of ethylenically unsaturated groups.

7. The polyisocyanate addition compounds of claim 3 wherein the polyisocyanate addition compounds contain 0.05 to 10% by weight, based on solids, of fluorine and 2 to 20% by weight of ethylenically unsaturated groups.

8. The polyisocyanate addition compounds of claim 4 wherein the polyisocyanate addition compounds contain 0.05 to 10% by weight, based on solids, of fluorine and 2 to 20% by weight of ethylenically unsaturated groups.

9. A coating composition which is curable by free radical polymerization and contains the polyisocyanate addition compounds of claim 1.

* * * * *